United States Patent
Voinov

(10) Patent No.: US 9,169,024 B2
(45) Date of Patent: Oct. 27, 2015

(54) ENVIRONMENTAL CONTROL SYSTEM WITH CLOSED LOOP PRESSURE CYCLE

(75) Inventor: Soren Voinov, Torrance, CA (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 646 days.

(21) Appl. No.: 13/103,881

(22) Filed: May 9, 2011

(65) Prior Publication Data
US 2012/0285184 A1 Nov. 15, 2012

(51) Int. Cl.
F25D 9/00 (2006.01)
B64D 13/06 (2006.01)

(52) U.S. Cl.
CPC ........ *B64D 13/06* (2013.01); *B64D 2013/0618* (2013.01); *Y02T 50/56* (2013.01)

(58) Field of Classification Search
CPC .............. B64D 13/00; B64D 13/06; B64D 2013/0618; Y02T 50/56; F02C 6/08; F02C 3/13; F02C 3/34; F02C 6/086; F02C 9/18
USPC ............ 62/401, 402, 87, 172; 60/782, 39.181
See application file for complete search history.

(56) References Cited

U.S. PATENT DOCUMENTS

| | | | |
|---|---|---|---|
| 4,018,060 A * | 4/1977 | Kinsell et al. | 62/91 |
| 5,036,678 A * | 8/1991 | Renninger et al. | 62/402 |
| 5,442,905 A * | 8/1995 | Claeys et al. | 60/785 |
| 5,860,283 A | 1/1999 | Coleman et al. | |
| 5,967,461 A * | 10/1999 | Farrington | 244/118.5 |
| 6,098,395 A | 8/2000 | North | |
| 6,199,387 B1 * | 3/2001 | Sauterleute | 62/87 |
| 7,293,414 B1 | 11/2007 | Huber | |
| 2005/0011217 A1 * | 1/2005 | Brutscher et al. | 62/402 |
| 2009/0117840 A1 * | 5/2009 | Kresser et al. | 454/71 |
| 2013/0061611 A1 * | 3/2013 | Dittmar et al. | 62/56 |

* cited by examiner

Primary Examiner — Cheryl J Tyler
Assistant Examiner — Ana Vazquez
(74) Attorney, Agent, or Firm — Shimokaji IP

(57) ABSTRACT

An environmental control system (ECS) for providing conditioned air to a cabin of an aircraft at a desired rate may include a bleed-air driven primary air treatment unit configured to produce pack supply air and to recirculate a portion of the pack supply air into a compressor of the primary air treatment unit. The ECS may also include a bleed-air driven secondary air treatment unit configured to compress ram air at a rate that corresponds to the rate of recirculation. The ECS may be configured to selectively deliver conditioned air from both the primary and the secondary air treatment units to the cabin.

10 Claims, 5 Drawing Sheets

| 201 | 202 | 203 | 204 | 205 | 206 | 207 | 208 | 209 | 210 | 211 | 212 |
|---|---|---|---|---|---|---|---|---|---|---|---|
| CLP FLOW W | RECIRC FLOW % %W | RECIRC FLOW WR | PRIMARY SUPPLY FLOW W1 | SECONDARY SUPPLY FLOW W2 | CABIN FLOW Wcabin | PRIMARY BLEED FLOW WB1 | SECONDARY BLEED FLOW WB2 | TOTAL BLEED FLOW WB | BASELINE BLEED FLOW WB0 | BLEED CONSUMPTION DIFFERENCE WB0-WB | BLEED CONSUMPTION % REDUCTION %=((WB0-WB)/WB0) |
| lb/min | | lb/min | lb/min | lb/min | lb/min | lb/min | lb/min | lb/min | lb/min | lb/min | |
| 72 | 10 | 7.2 | 64.8 | 7.2 | 72.0 | 64.8 | 2.6 | 67.4 | 72 | 4.6 | 6 |
| 72 | 20 | 14.4 | 57.6 | 14.4 | 72.0 | 57.6 | 4.6 | 62.2 | 72 | 9.8 | 14 |
| 72 | 30 | 21.6 | 50.4 | 21.6 | 72.0 | 50.4 | 6.6 | 57.0 | 72 | 15.0 | 21 |

| CLP FLOW W lb/min | RECIRC FLOW % %W | RECIRC FLOW WR lb/min | PRIMARY SUPPLY FLOW W1 lb/min | SECONDARY SUPPLY FLOW W2 lb/min | CABIN FLOW Wcabin lb/min | PRIMARY BLEED FLOW WB1 lb/min | SECONDARY BLEED FLOW WB2 lb/min | TOTAL BLEED FLOW WB lb/min | BASELINE BLEED FLOW WB0 lb/min | BLEED CONSUMPTION DIFFERENCE WB0−WB lb/min | BLEED CONSUMPTION % REDUCTION %=((WB0−WB)/WB0) |
|---|---|---|---|---|---|---|---|---|---|---|---|
| 72 | 10 | 7.2 | 64.8 | 7.2 | 72.0 | 64.8 | 12.6 | 77.4 | 72 | −5.4 | −7 |
| 72 | 20 | 14.4 | 57.6 | 14.4 | 72.0 | 57.6 | 13.4 | 71.0 | 72 | 1.0 | 1 |
| 72 | 30 | 21.6 | 50.4 | 21.6 | 72.0 | 50.4 | 14.3 | 64.7 | 72 | 7.3 | 10 |

ENVIRONMENTAL CONTROL SYSTEM WITH CLOSED LOOP PRESSURE CYCLE

BACKGROUND OF THE INVENTION

The present invention generally relates to environmental control systems for vehicles such as aircraft.

A bleed-air driven environmental control system (ECS) may be employed in an aircraft to provide cabin air at a desired temperature and humidity level. Such a system may utilize a bleed-air supplied compressor driven by one or more expansion turbines to produce conditioned air. A typical ECS may be constructed to produce conditioned air at a desired rate irrespective of whether the aircraft may be at ground level or in flight. In many instances, an aircraft at ground level may be in a high-temperature environment. To account for such possibilities, a typical ECS may be constructed to accommodate such high-temperature environment conditions (i.e., worst case conditions). A typical ECS may be constructed to consume bleed air at about a ground level rate even when the aircraft may be in flight at a high altitude.

As can be seen, there is a need for an ECS that may produce conditioned air at a desired rate during sea level and altitude conditions with lower bleed consumption than current systems thus reducing engine fuel consumption and increasing aircraft flight range.

SUMMARY OF THE INVENTION

In one aspect of the present invention, an environmental control system (ECS) for a vehicle may comprise: a primary air treatment unit; a secondary air treatment unit; and a condenser configured to cool compressed air from the secondary air treatment unit with pack air flow from the primary air treatment unit.

In another aspect of the present invention, an environmental control system (ECS) for providing conditioned air to a cabin of an aircraft at a desired rate may comprise: a bleed-air driven primary air treatment unit configured to produce pack supply air and to recirculate a portion of the first stage cooling turbine discharge air into a compressor of the primary air treatment unit; a bleed-air driven secondary air treatment unit configured to compress ram air at a rate that corresponds to a difference between the desired rate of production of conditioned air and a rate at which the primary air treatment unit re-circulates conditioned air, the system being configured to selectively deliver conditioned air from both the primary and the secondary air treatment units to the cabin.

In still another aspect of the invention, a method for conditioning cabin air in an aircraft may comprise the steps of: driving a primary air treatment unit with bleed air from an engine of the aircraft; selectively driving a secondary air treatment unit with bleed air from the engine; cooling compressed air from the secondary air treatment unit with output from the primary air treatment unit; selectively combining outputs from both the primary and the secondary air treatment units; and delivering the combined outputs to the cabin.

These and other features, aspects and advantages of the present invention will become better understood with reference to the following drawings, description and claims.

BRIEF DESCRIPTION OF THE DRAWINGS

FIG. 2 is a chart showing various performance parameters of the ECS of FIG. 1;

FIG. 4 is a chart showing various performance parameters of the ECS of FIG. 3.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide an environmental control system (ECS) having a primary air treatment unit and an adjunct secondary air treatment unit, each of which may be driven with bleed air from an engine of a vehicle.

Figure 1:
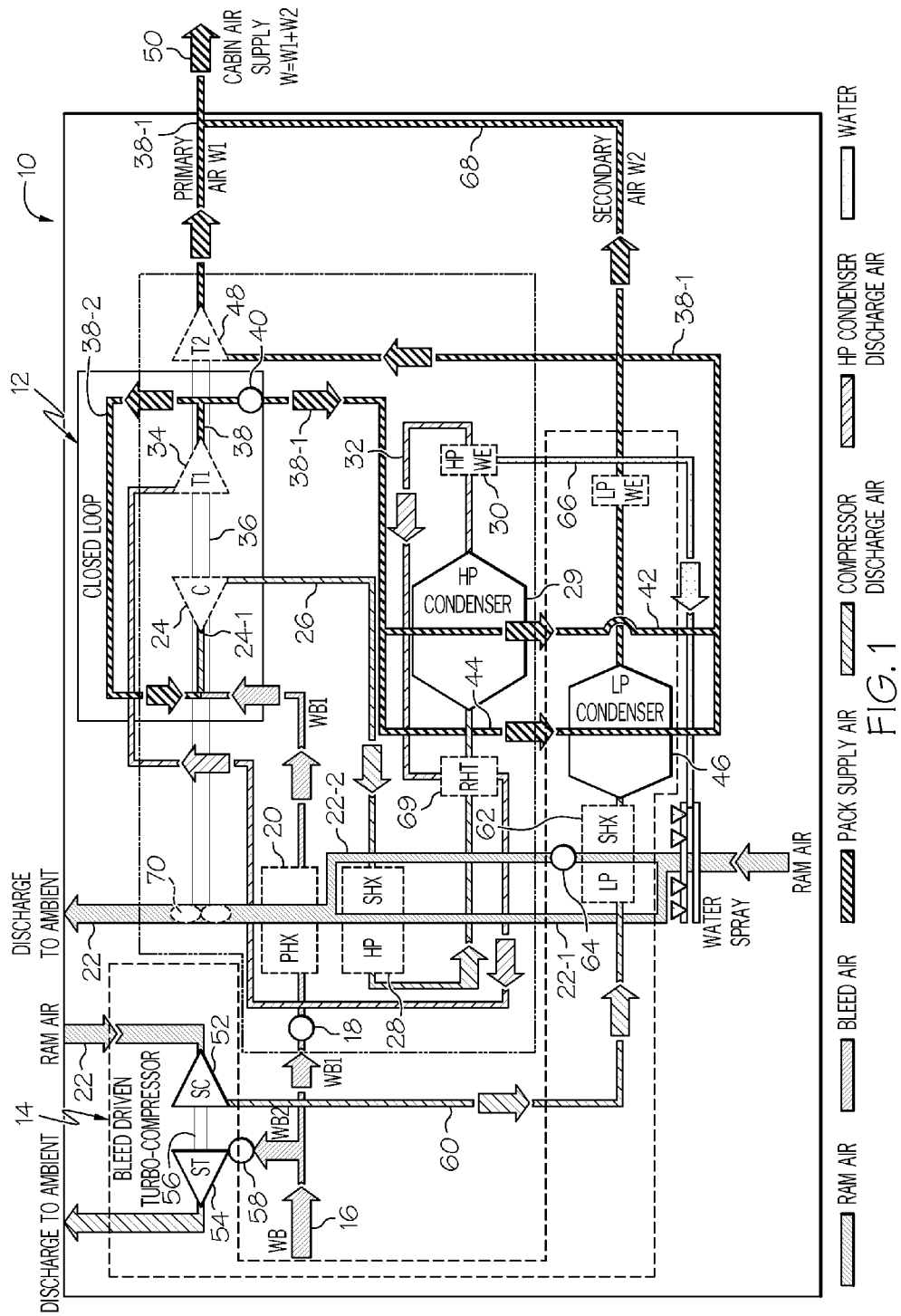
FIG. 1 is a block diagram of an environmental control system (ECS) in accordance with an embodiment of the invention.

Referring now to FIG. 1, it may be seen that an exemplary embodiment of an ECS 10 may comprise a primary air treatment unit 12 and a secondary air treatment unit 14. The ECS 10 may be installed in a vehicle such as an aircraft (not shown) and may provide conditioned air for passengers and crew in a cabin (not shown) of the aircraft. An engine (not shown) of the aircraft may supply bleed air 16 to the ECS 10. The bleed air 16 may provide mechanical energy to drive the ECS 10.

A first portion (referred to hereinafter as bleed air WB1) of the bleed air 16 may be admitted to the primary unit 12 through a valve 18. The bleed air WB1 may pass through a primary heat exchanger 20 for initial cooling by a flow of ram air 22 and then pass into and drive a compressor 24. Primary compressor discharge air 26 may pass through a high pressure secondary heat exchanger 28 and may be cooled with a flow of the ram air 22 though a flow path 22-1 The compressor discharge air 26 may then pass through a reheater 69, a high pressure condenser 29 and a high pressure water extractor 30 and emerge as high-pressure, condenser-discharge air 32. The air 32, after being warmed up in reheater 69, may then pass into a first primary expansion turbine 34 which may be driven on a shaft 36 that is driven by the bleed air WB1.

Cold dry air, hereinafter referred to as first turbine discharge air 38 may emerge from the expansion turbine 34 at a temperature above freezing. A flow of the first turbine discharge air 38 may be divided into a primary pack air flow 38-1 and a recirculated air flow 38-2. Proportioning of the flows 38-1 and 38-2 may be controlled with a proportioning valve 40.

The recirculated air flow 38-2 may be passed to an inlet 24-1 of the compressor 24 and mixed with the bleed air WB1 to provide mechanical energy to drive the compressor 24 and the shaft 36. A remaining portion of the first turbine discharge air 38 (i.e., the primary pack air flow 38-1) may be directed, in parallel paths 42 and 44, through the high pressure condenser 29 and a low pressure condenser 46 to provide cooling of the condensers 29 and 46.

After emerging from the condensers 29 and 46, the air flow 38-1 may enter a second primary expansion turbine 48 for further expansion cooling. The expansion turbine 48 may drive the shaft 36. The further cooled flow 38-1 may be then admitted to the cabin as a first portion of cabin air supply 50.

The secondary air treatment unit 14 of the ECS 10 may comprise a secondary compressor 52, a secondary turbine 54, a low pressure secondary heat exchanger 62, a low pressure condenser 46 and a low pressure water extractor 66. The secondary compressor 52 and the secondary turbine 54 may be connected on a common shaft 56. Some of the bleed air 16 may be admitted to drive the turbine 54 and the interconnected compressor 52. A control valve 58 may be employed to control an amount of the bleed air (hereinafter referred to as bleed air WB2) that may be admitted to the turbine 54. The compressor 52 may be supplied with ram air 22 and it may discharge compressed air 60. The compressed air 60 may be passed through a low pressure heat exchanger 62 which may be cooled by a flow of ram air 22 through a flow path 22-2. Flow rate of the ram air flow through the flow path 22-2 may be controlled with a valve 64.

Cooled compressed air 60 may emerge from the heat exchanger 62 and enter the low pressure condenser 46. Within the condenser 46, the compressed air 60 may be further cooled through heat absorption by the portion of the primary pack air flow 38-1 which may flow through the path 44. Air emerging from the condenser 46 may enter a low pressure water extractor 66 and then emerge from the water extractor 66 as secondary pack air flow 68. The secondary pack air flow 66 may be combined with the primary pack air flow 38-1 and may be admitted to the cabin of the aircraft.

It may be noted that the ECS 10 may recirculate some of its first turbine discharge air 38 back into the inlet 24-1 of compressor 24, thereby reducing the amount of bleed air needed to drive the compressor 24. Consequently, there may be a desirable reduction in bleed air usage by the turbine 34 that may result from such recirculation. It may also be noted that an increase in a proportional amount of the air 38-2 which is recirculated may result in a reduced amount of the air 38 that may available for cooling in the condensers 29 and 46. In other words, as flow 38-2 increases, flow 38-1 may decrease correspondingly.

It may be noted that an amount of air flow equal to the recirculated flow 38-1 may not be supplied by the ECS 10 to the cabin. Airflow equivalent to the flow 38-2 may be supplied by the secondary compressor 52 which may be driven by the secondary turbine 54 bleed driven by bleed flow WB2. The amount of bleed flow WB2 required by per pound of compressed air may be about 0.36 lb/min. this favorable ratio may result in bleed flow savings. Taking these factors into consideration, the ECS 10 may be operated in a manner that achieves an overall reduction of bleed air usage for a particular volume of properly conditioned cabin air.

Referring to FIG. 2, an exemplary chart 200 of operating conditions of the ECS 10 may be compared as the ECS 10 may produce conditioned air 50 at an exemplary rate of 72 pounds per minute (lbs/min). Column 206 may show a desired flow rate of conditioned air into the cabin. Column 201 may show the closed loop pressure (CLP) flow (or compressor 24 supply flow). Column 202 may show a percentage of the flow that may be recirculated. Column 203 may show a rate at which recirculation may occur. Column 204 may show a rate at which conditioned air may be supplied from the primary air treatment unit 12. Column 205 may show a rate at which conditioned air may be supplied from the secondary air treatment unit 14. Column 207 may show a rate of bleed air flow to the primary unit 12. Column 208 may show a rate of bleed air flow to the secondary unit 14. Column 209 may show a total bleed air flow to the ECS 10. Column 210 may show an amount of bleed air flow that would occur if there were no recirculation and if the secondary air treatment unit 14 were not operated. Column 211 may show a rate of bleed air consumption reduction with recirculation occurring and with the secondary unit 14 operating. Column 212 may show a percentage savings rate of bleed air based on recirculation occurring and with the secondary unit 14 operating relative to the bleed consumption without recirculation and secondary unit 14 not operated. It may be seen that at a recirculation rate of 10% (Column 202), the compressor 24 may consume 64.8 lbs/min of bleed air (column 204) and the turbine 54 may consume 2.6 lbs/min of bleed air (column 208). It may be noted that the compressor 52 may pump air at the same rate (column 205) as a recirculation rate shown in column 203. Thus a 10% recirculation rate may provide a savings of 6% (column 212) of the bleed air as compared to an operating condition in which there is no recirculation and in which the secondary air treatment unit 14 may not be operated. Similarly, it may be seen that recirculation rates of 20% and 30% may provide comparative savings of 14% and 21% of bleed air respectively.

While it may appear that progressively higher rates of recirculation may produce successively higher percentages of bleed air savings, it may be noted that progressively higher rates of recirculation may result in progressively lower amounts of cooling for the condensers 29 and 46. As a practical matter, it has been found that when the recirculation rate exceeds 30%, the condensers 29 and 46 may be subjected to cooling loads that may not be met by the cooling capability of the diminished flow 38-1. Consequently, it may be desirable to operate the ECS 10 with a recirculation rate no greater than 30%.

Figure 3:
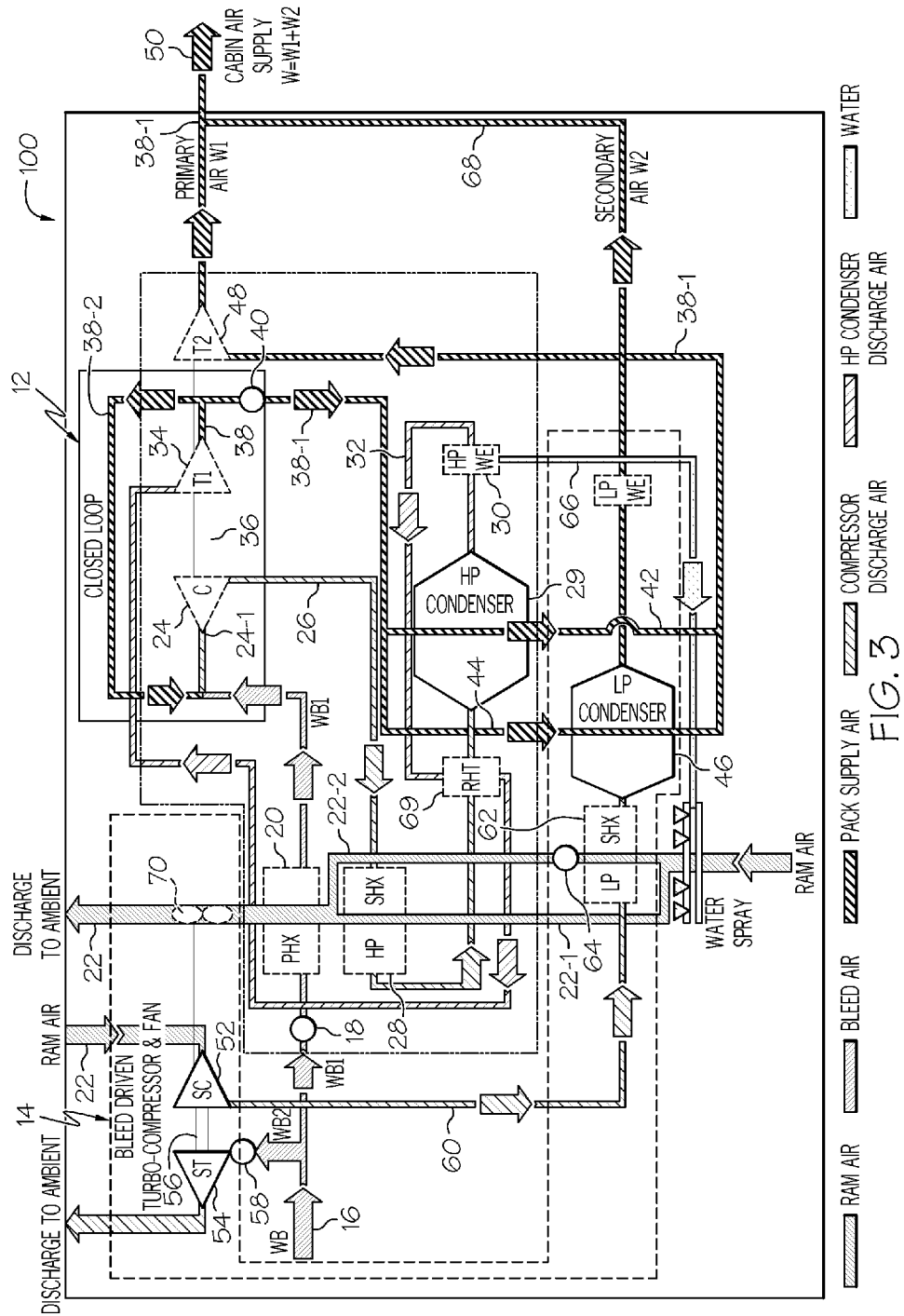
FIG. 3 is a block diagram of an environmental control system (ECS) in accordance with another embodiment of the invention.

Referring now to FIG. 3, it may be seen that an alternate embodiment of an ECS 100 may comprise elements that are the same as those of the ECS 10 of FIG. 1 except for location of a ram air fan 70. Comparing FIG. 3 with FIG. 1, it may be seen that on the ECS 100, the ram air fan 70 may be driven by the shaft 56 of the secondary air treatment unit 14, whereas on the ECS 10, the ram air fan 70 may be driven by the shaft 36 of the primary air treatment unit 12.

During altitude flight, cabin air of suitable volume and quality may be attainable without operation of the secondary air treatment unit 14. Movement of the aircraft at cruising speed may be sufficient to produce ram air flow through the heat exchangers 20 and 28 without a need for fan driven forced cooling. Consequently, the ECS 100 may provide for some advantageous fuel savings during altitude (e.g., greater than 10,000 feet) operation of the aircraft because there may be no energy consumed in operation of the fan 70.

Referring to FIG. 4, an exemplary chart 400 of operating conditions of the ECS 100 may be compared as the ECS 100 may produce conditioned air 50 at an exemplary rate of 72 pounds per minute (lbs/min). Column 406 may show a desired flow rate of conditioned air into the cabin. Column 401 may show the closed loop pressure (CLP) flow (or compressor 24 supply flow). Column 402 may show a percentage of the flow that may be recirculated. Column 403 may show a rate at which recirculation may occur. Column 404 may show a rate at which conditioned air may be supplied from the primary air treatment unit 12. Column 405 may show a rate at which conditioned air may be supplied from the secondary air treatment unit 14. Column 407 may show a rate of bleed air flow to the primary unit 12. Column 408 may show a rate of bleed air flow to the secondary unit 14. Column 409 may show a total bleed air flow to the ECS 10. Column 410 may show an amount of bleed air flow that would occur if there were no recirculation and if the secondary air treatment unit 14 were not operated. Column 411 may show a rate of bleed air consumption reduction with recirculation occurring and with the secondary unit 14 operating. Column 412 may show a percentage savings rate of bleed air based on recirculation occurring and with the secondary unit 14 operating relative to the bleed consumption without recirculation and secondary unit 14 not operated. It may be seen that a recirculation rate of 10% (Column 402) the compressor 24 may consume 64.8 lbs/min of bleed air (column 404) and the turbine 54 may consume 12.6 lbs/min of bleed air (column 408). Thus a 10% recirculation rate may not provide a savings of bleed air. However, it may be seen that recirculation rates of 20% and 30% may provide comparative savings of 1% and 10% of bleed air respectively (column 412). Consequently, it may be desirable to operate the ECS 100 with a recirculation rate a least as high as about 20%.

Referring now to FIGS. 2 and 4, it may be recognized that the ECS 10 may be an optimal choice for an aircraft that may be operated in an environment with high temperature ground conditions and/or relatively short flight durations at altitudes above 10,000 feet. The ECS 10 may be operated with a low rate of recirculation (e.g. 10%) while still attaining bleed air savings at ground level and low altitude flight. The condensers 28 and 46 may be suitably cooled at high ground temperatures because there may be sufficient flow of the pack air 38-1 through the condensers.

On the other hand, the ECS 100 may be an optimal choice for an aircraft that may be operated in an environment with relatively long flight durations at altitudes above 10,000 feet. In such operating conditions, lack of bleed air savings at ground level and low altitude flight may be less consequential than fuel savings that may result from avoiding operation of the ram air fan 70 at high altitude flight.

Figure 5:
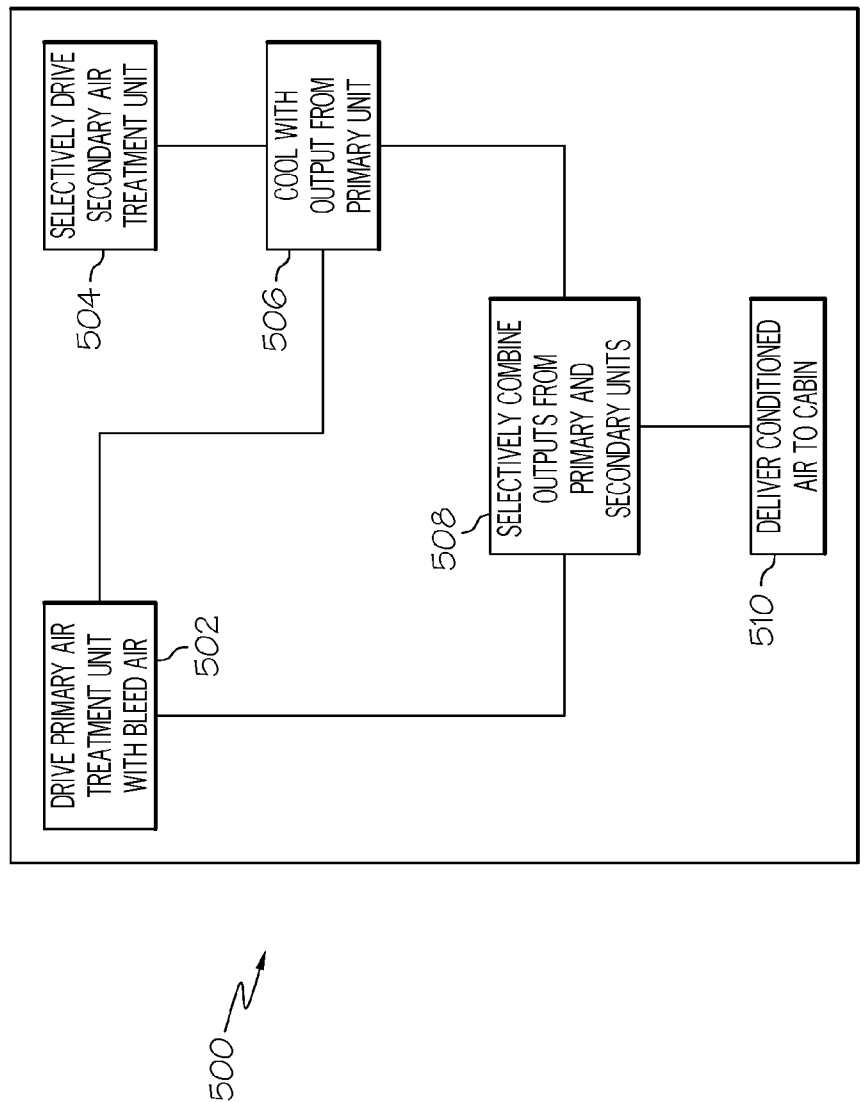
FIG. 5 is a flow chart of a method for providing conditioned air in accordance with an embodiment of the invention.

Referring now to FIG. 5, a flow chart 500 may illustrate an exemplary method for conditioning cabin air in an aircraft. In a step 502, a primary air treatment unit may be driven with bleed air from an engine of the aircraft (e.g., the compressor 24 of the primary air treatment unit 12 may be driven by bleed air to drive the shaft 36 through the expansion in turbines 34 and 48). In a step 504, a secondary air treatment unit may be selectively driven with bleed air from the engine (e.g., at ground level and in low altitude flight, bleed air may be admitted to drive the turbine 54 of the secondary air treatment unit 14 so that the secondary compressor 52 may compress ram air). In a step 506, compressed air from the secondary air treatment unit may be cooled with output from the primary air treatment unit (e.g., the compressed air 60 from the unit 14 may be passed through the condenser 46 which may be cooled by the flow 38-1 from the primary air treatment unit 12 through flow path 44). In a step 508, outputs from both the primary and the secondary air treatment units may be selectively combined (e.g., at ground level and in low altitude flight, the air flows 68 and 38-1 may be combined to produce the cabin air supply 50). In a step 510, the combined outputs may be delivered to the cabin.

It should be understood, of course, that the foregoing relates to exemplary embodiments of the invention and that modifications may be made without departing from the spirit and scope of the invention as set forth in the following claims.

I claim:

1. A method for conditioning cabin air comprising the steps of:
    driving a primary air treatment unit with bleed air from an engine of an aircraft;
    wherein the primary air treatment unit includes a primary compressor, a first primary turbine, a second primary turbine, and a primary condenser;
    introducing a first portion of first primary turbine discharge air directly into an inlet of the primary compressor;
    driving the primary compressor simultaneously with both the first portion of the first primary turbine discharge air and with the bleed air;
    selectively driving a secondary air treatment unit with bleed air from the engine;
    wherein the secondary air treatment unit includes a secondary compressor, a secondary turbine, and a secondary condenser;
    cooling compressed air from the primary compressor with a second portion of the first primary turbine discharge air;
    cooling compressed air from the secondary compressor with the second portion of first primary turbine discharge air;
    driving the second primary turbine with the second portion of first primary turbine discharge air;
    selectively combining air outputs from both the primary and the secondary air treatment units; and
    delivering the combined outputs to the cabin.

2. The method of claim 1 wherein the first portion of first primary turbine discharge air introduced into the inlet of the primary compressor comprises at least 20% of output of the primary compressor.

3. The method of claim 1 wherein the first portion of first primary turbine discharge air introduced into the inlet of the primary compressor comprises no more than about 30% of output of the primary compressor.

4. The method of claim 1 wherein the step of selectively driving the secondary air treatment unit comprises compressing ram air.

5. The method of claim 4 wherein compressed ram air is cooled with the first primary turbine discharge air flow from the primary air treatment unit.

6. A system for conditioning cabin air comprising: a primary air treatment unit including a primary compressor, a first primary turbine, a second primary turbine, and a primary condenser; wherein the first primary turbine produces a first portion of discharge air and a second portion of discharge air; wherein the primary compressor receives the first portion of discharge air; wherein the second portion of discharge air splits into a third portion of discharge air and a fourth portion of discharge air; wherein the primary condenser receives the third portion of discharge air; a secondary air treatment unit including a second compressor, a secondary turbine, and a secondary condenser; wherein the secondary condenser receives the fourth portion of discharge air; wherein the second primary turbine receives the third and fourth portions of discharge air; wherein the primary air treatment unit is driven with bleed air from an engine of an aircraft; wherein the secondary air treatment unit is driven with bleed air from the engine; and wherein air outputs from both the primary and the secondary air treatment units are combined and delivered to a cabin.

7. The system of claim 6 wherein a recirculated portion of a pack air supply comprises at least 20% of output of the primary compressor.

8. The system of claim 7 wherein the environmental control system selectively drives the secondary air treatment unit using compressed ram air.

9. The system of claim 8 wherein compressed ram air is cooled with the first portion of discharge air from the primary air treatment unit.

10. The system of claim 6 wherein the first portion of discharge air directly introduced into an inlet of the primary compressor comprises no more than about 30% of output of the primary compressor.

* * * * *